(12) United States Patent
Fenger et al.

(10) Patent No.: US 12,511,773 B2
(45) Date of Patent: Dec. 30, 2025

(54) WAFER IMAGE DENOISING AND CONTOUR EXTRACTION FOR MANUFACTURING PROCESS CALIBRATION

(71) Applicant: Siemens Industry Software Inc., Plano, TX (US)

(72) Inventors: Germain Louis Fenger, Gladstone, OR (US); Mark Pereira, Bengaluru (IN); Bhamidipati Venkata Rama Samir, Bengaluru (IN); Sandip Halder, Bierbeek (BE); Bappaditya Dey, Heverlee (BE); Hsin-Wei Wu, Heverlee (BE); Kiarash Ahi, San Jose, CA (US)

(73) Assignee: Siemens Industry Software Inc., Plano, TX (US)

( * ) Notice: Subject to any disclaimer, the term of this patent is extended or adjusted under 35 U.S.C. 154(b) by 381 days.

(21) Appl. No.: 17/823,741

(22) Filed: Aug. 31, 2022

(65) Prior Publication Data

US 2023/0342965 A1 Oct. 26, 2023

Related U.S. Application Data

(60) Provisional application No. 63/334,569, filed on Apr. 25, 2022.

(51) Int. Cl.
*G06K 9/00* (2022.01)
*G06T 5/70* (2024.01)
(Continued)

(52) U.S. Cl.
CPC ............ *G06T 7/64* (2017.01); *G06T 5/70* (2024.01); *G06T 7/0006* (2013.01); *G06T 7/001* (2013.01);
(Continued)

(58) Field of Classification Search
CPC ............ G06T 5/70; G06T 7/0004; G06T 2207/30148; G06T 2207/10061; G06T 7/001; G06T 7/0006
See application file for complete search history.

(56) References Cited

U.S. PATENT DOCUMENTS

| 7,786,437 B2 * | 8/2010 | Toyoda | H01L 22/12 382/199 |
| 9,036,896 B2 * | 5/2015 | Touya | G06T 7/001 382/141 |

(Continued)

OTHER PUBLICATIONS

L. Yu, W. Zhou, L. Pu, and W. Fang, "Sem image quality enhancement: an unsupervised deep learning approach." International Society for Optics and Photonics. Metrology, Inspection, and Process Control for Microlithography XXXIV, vol. 11325, Mar. 20, 2020, pp. 388-396.

(Continued)

*Primary Examiner* — Avinash Yentrapati

(57) ABSTRACT

This application discloses a computing system to obtain a wafer image of an electronic device having physical structures manufactured using one or more lithographic masks associated with a layout design describing the electronic design. The computing system can implement an unsupervised deep learning algorithm to process the wafer image to remove at least some noise from the wafer image, which generates a denoised wafer image. The computing system can extract contours corresponding to the physical structures of the electronic device from the denoised wafer image of the electronic device without use of the layout design or a mask design. The computing system can calibrate the layout design or the mask design describing the one or more lithographic masks based, at least in part, on the contours extracted from the denoised wafer image.

20 Claims, 5 Drawing Sheets

(51) Int. Cl.
 G06T 7/00 (2017.01)
 G06T 7/62 (2017.01)
 G06T 7/64 (2017.01)
(52) U.S. Cl.
 CPC ...... *G06T 7/62* (2017.01); *G06T 2207/20081* (2013.01); *G06T 2207/30148* (2013.01)

(56) References Cited

U.S. PATENT DOCUMENTS

| | | | | |
|---|---|---|---|---|
| 2013/0322737 | A1* | 12/2013 | Murakami | G06T 7/001 382/149 |
| 2019/0347781 | A1* | 11/2019 | Huang | G06T 7/13 |
| 2022/0327693 | A1* | 10/2022 | Kim | A61B 6/469 |
| 2023/0185187 | A1* | 6/2023 | Hamouda | G06T 7/64 716/51 |

OTHER PUBLICATIONS

K. Dabov, A. Foi, V. Katkovnik, and K. Egiazarian, "Image denoising by sparse 3-d transform-domain collaborative filtering," IEEE Transactions on image processing, vol. 16, No. 8, pp. 2080-2095, Aug. 8, 2007.

V. Jain and S. Seung, "Natural image denoising with convolutional networks," Advances in neural information processing systems, vol. 21, Jan. 2008.

J. Lehtinen, J. Munkberg, J. Hasselgren, S. Laine, T. Karras, M. Aittala, and T. Aila, "Noise2noise: Learning image restoration without clean data," Proceedings of the 35th International Conference on Machine Learning, Oct. 29, 2018.

J. Chen, J. Chen, H. Chao, and M. Yang, "Image blind denoising with generative adversarial network based noise modeling," 2018 IEEE/CVF Conference on Computer Vision and Pattern Recognition, pp. 3155-3164, Jun. 2018.

K. Zhang, W. Zuo, Y. Chen, D. Meng, and L. Zhang, "Beyond a gaussian denoiser: Residual learning of deep CNN for image denoising." IEEE transactions on image processing, vol. 26, Issue 7. Aug. 2016.

C. A. Mack and B. D. Bunday, "Using the analytical linescan model for sem metrology," Metrology, Inspection, and Process Control for Microlithography XXXI, vol. 10145. SPIE, Mar. 2017.

T. Verduin, P. Kruit, and C. W. Hagen, "Determination of line edge roughness in low dose top-down scanning electron microscopy images," International Society for Optics and Photonics, Metrology, Inspection, and Process Control for Microlithography XXVIII, vol. 9050. SPIE, Jul. 2014.

N. Marturi, S. Dembélé, and N. Piat, "Scanning electron microscope image signal-to-noise ratio monitoring for micro-nanomanipulation," Scanning: The Journal of Scanning Microscopies, vol. 36, No. 4, pp. 419-429, Jul. 2014.

* cited by examiner

WAFER IMAGE DENOISING AND CONTOUR EXTRACTION FOR MANUFACTURING PROCESS CALIBRATION

RELATED APPLICATION

This patent application claims priority to U.S. Provisional Patent Application No. 63/334,569, filed Apr. 25, 2022, which is incorporated by reference herein.

TECHNICAL FIELD

This application is generally related to electronic design automation and, more specifically, to wafer image denoising and contour extraction for manufacturing process calibration.

BACKGROUND

In a design flow for fabricating integrated circuits, a physical design of an integrated circuit can describe specific geometric elements, often referred to as a layout design. The geometric elements, which typically are polygons, define the shapes that will be created in various materials to manufacture the integrated circuit. Typically, a designer will select groups of geometric elements representing circuit device components, e.g., contacts, gates, etc., and place them in a design area. These groups of geometric elements may be custom designed, selected from a library of previously-created designs, or some combination of both. Once the groups of geometric elements representing circuit device components have been placed, geometric elements representing connection lines then are then placed between these geometric elements according to the predetermined route. These lines will form the wiring used to interconnect the electronic devices.

Descriptions for physical designs of integrated circuits can be provided in many different formats. The Graphic Data System II (GDSII) format is a popular format for transferring and archiving two-dimensional (2D) graphical circuit layout data. Among other features, it contains a hierarchy of structures, each structure containing layout elements (e.g., polygons, paths or poly-lines, circles and textboxes). Other formats include an open source format named Open Access, Milkyway, EDDM, and Open Artwork System Interchange Standard (OASIS). These various industry formats are used to define the geometrical information in layout designs that are employed to manufacture integrated circuits. Once the design is finalized, the layout portion of the design can be used by fabrication tools to manufacture the circuit using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

Each time that a layer of material is exposed to radiation, a mask is created to expose only the desired areas to the radiation, and to protect the other areas from exposure. The mask is created from circuit layout data. That is, the geometric elements described in a layout design define the relative locations or areas of the circuit that will be exposed to radiation through the mask. A mask or reticle writing tool is used to create the mask based upon the layout design, after which the mask can be used in a photolithographic process.

As designers and manufacturers continue to increase the number of circuit components in a given area and/or shrink the size of circuit components, the shapes reproduced on the substrate (and thus the shapes in the mask) become smaller and are placed closer together. This reduction in feature size increases the difficulty of faithfully reproducing the image intended by the layout design onto the substrate. The diffractive effects of light often result in defects where the intended image is not accurately printed onto the substrate during the photolithographic process, creating flaws in the manufactured device. One or more resolution enhancement techniques (RETs) are often employed to improve the resolution of the image that the mask forms on the substrate during the photolithographic process.

One of these techniques—optical proximity correction (OPC)—adjusts the amplitude of the light transmitted through a lithographic mask by modifying the mask layout design data employed to create the mask. For example, edges in the mask layout design may be adjusted to make certain portions of the geometric elements larger or smaller, in accordance with how much additional light exposure (or lack of exposure) is desired at certain points on the substrate. When these adjustments are appropriately calibrated, overall pattern fidelity can be increased.

A specific form of optical proximity correction, called model-based optical proximity correction, can utilize the mask layout design data along with an optical proximity correction model, such as an OPC compact resist model, to predict a printed image on a substrate resulting from the light exposure through one or more masks described by the mask layout design data and then modify the mask layout design data. Typically, these OPC models are calibrated on the measured wafer data, available in the form of extensive scanning electron microscope (SEM) based measurements. With a continuing device scaling roadmap (3 nm and below), to provide more accurate metrology data for optical proximity correction (OPC) calibration, contour extraction, such as geometrical properties of critical dimension (CD), pitch, shape analysis, or the like, from low signal-to-noise ratio (SNR) SEM images can be challenging as different sources of noise shadow an estimation of underlying structural geometries.

SUMMARY

This application discloses a computing system to obtain a wafer image of an electronic device having physical structures manufactured using one or more lithographic masks associated with a layout design describing the electronic design. The computing system can implement an unsupervised deep learning algorithm to process the wafer image to remove at least some noise from the wafer image, which generates a denoised wafer image. The computing system can extract contours corresponding to the physical structures of the electronic device from the denoised wafer image of the electronic device without use of the layout design or a mask design. In some embodiments, the computing system can extract contours from the wafer image or the denoised image using a guided fine tuning process, which can analyze the extracted contours to remove any contours failing to correspond to the physical structures of the electronic device. The computing system also can extract contours from the wafer image or the denoised image using a deep learning algorithm or machine-learning algorithm. The computing system can calibrate the layout design or the mask design describing the one or more lithographic masks based, at least in part, on the contours extracted from the denoised wafer image. Embodiments of will be described below in greater detail.

DETAILED DESCRIPTION

Illustrative Operating Environment

Figure 1:
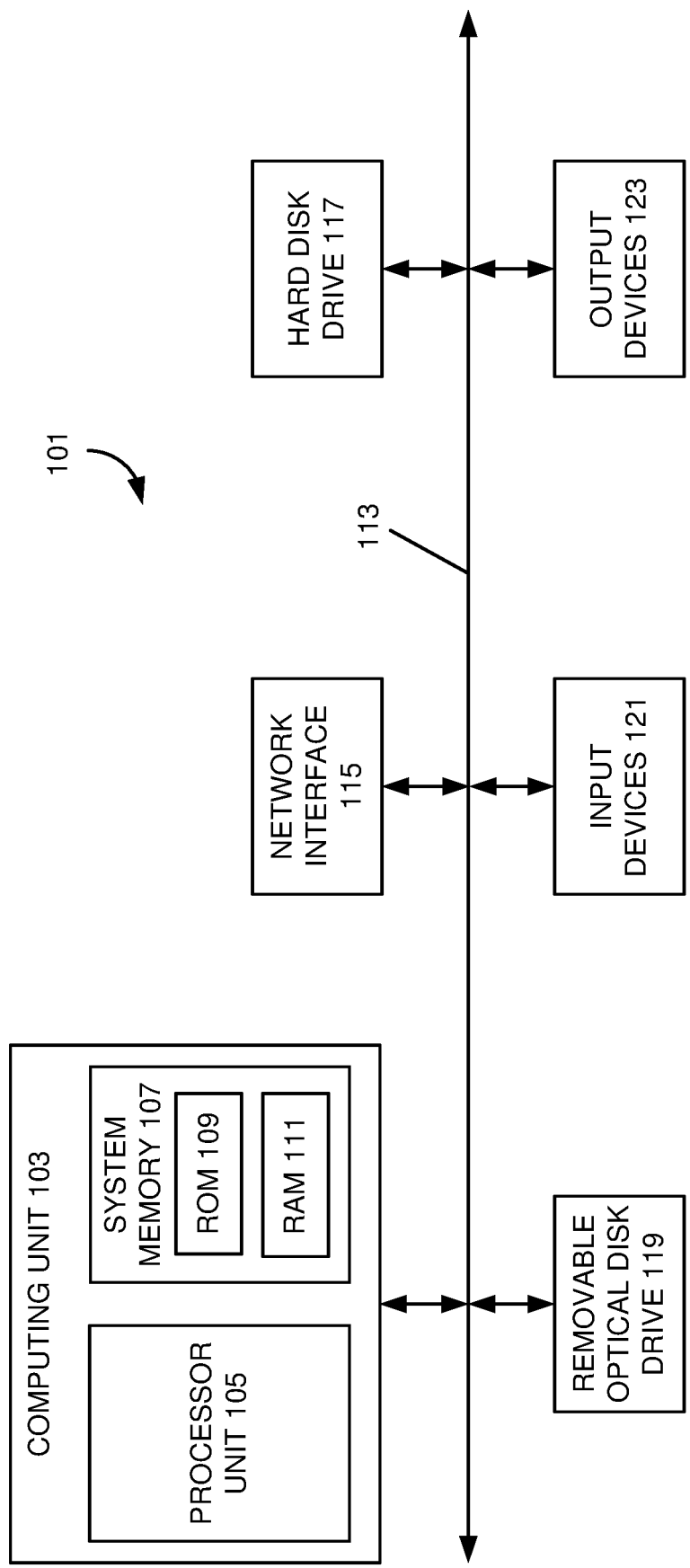
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 115-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
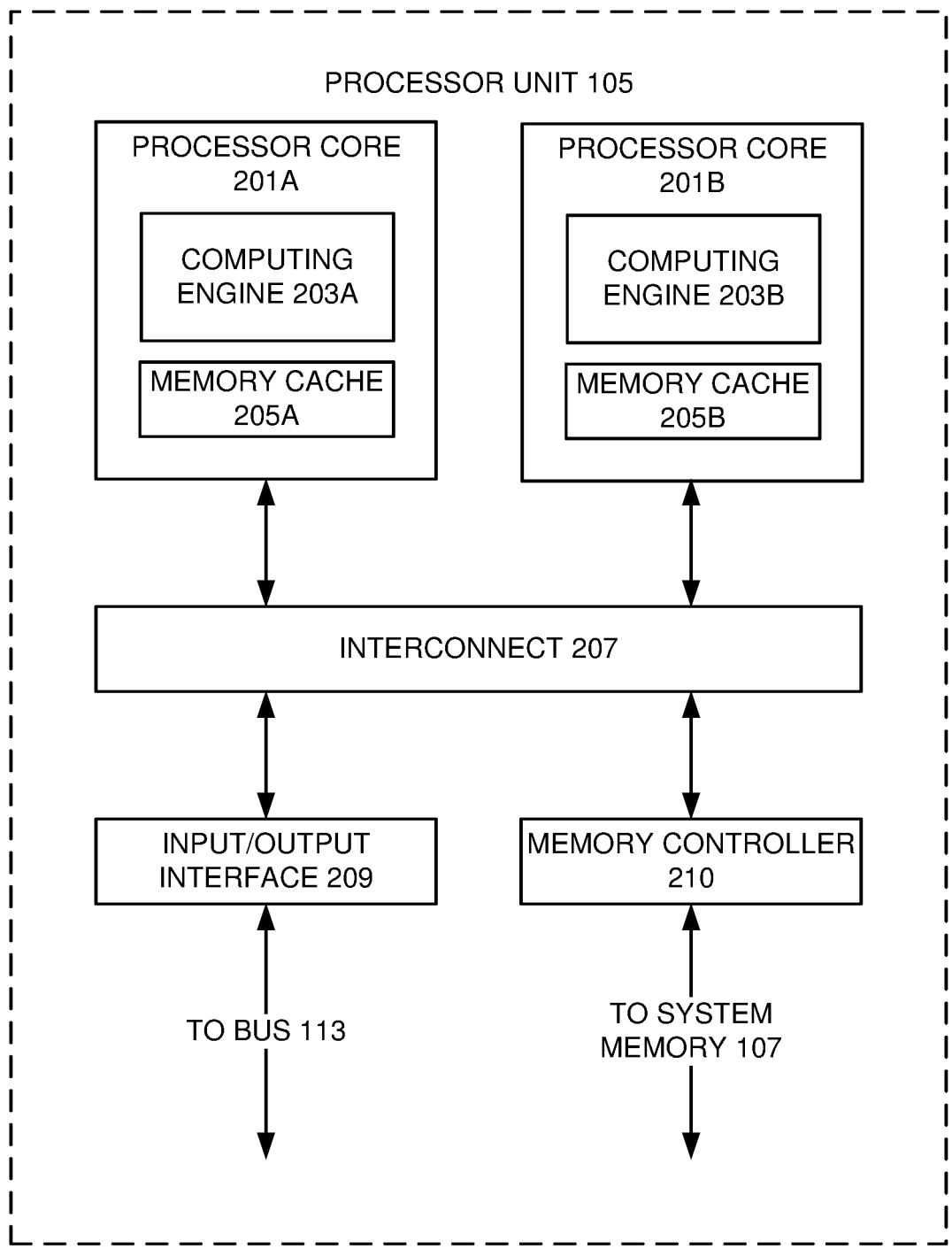

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Figure 3:
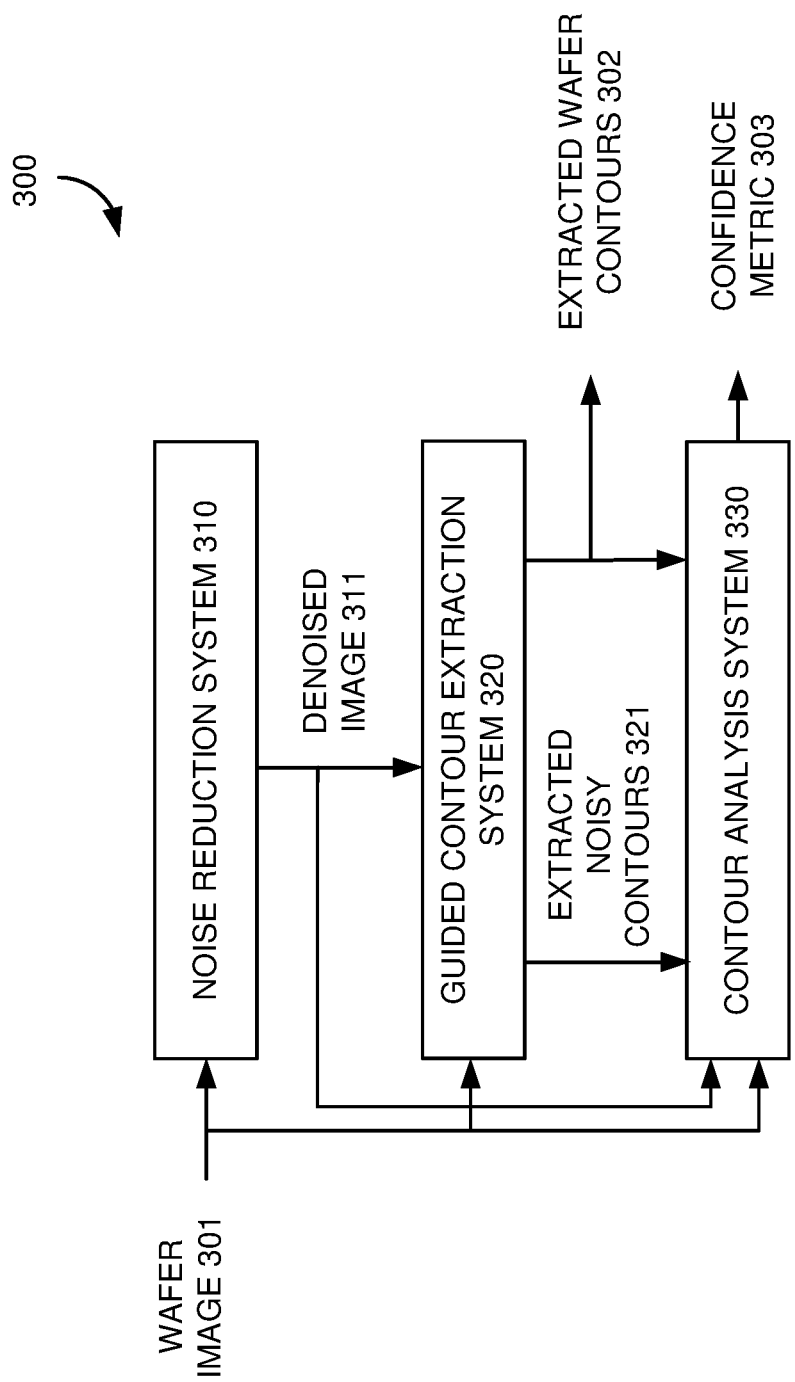
FIG. 3 illustrates an example of contour extraction tool implementing a wafer image denoising and contour extraction for manufacturing process calibration according to various embodiments.
Figure 4:
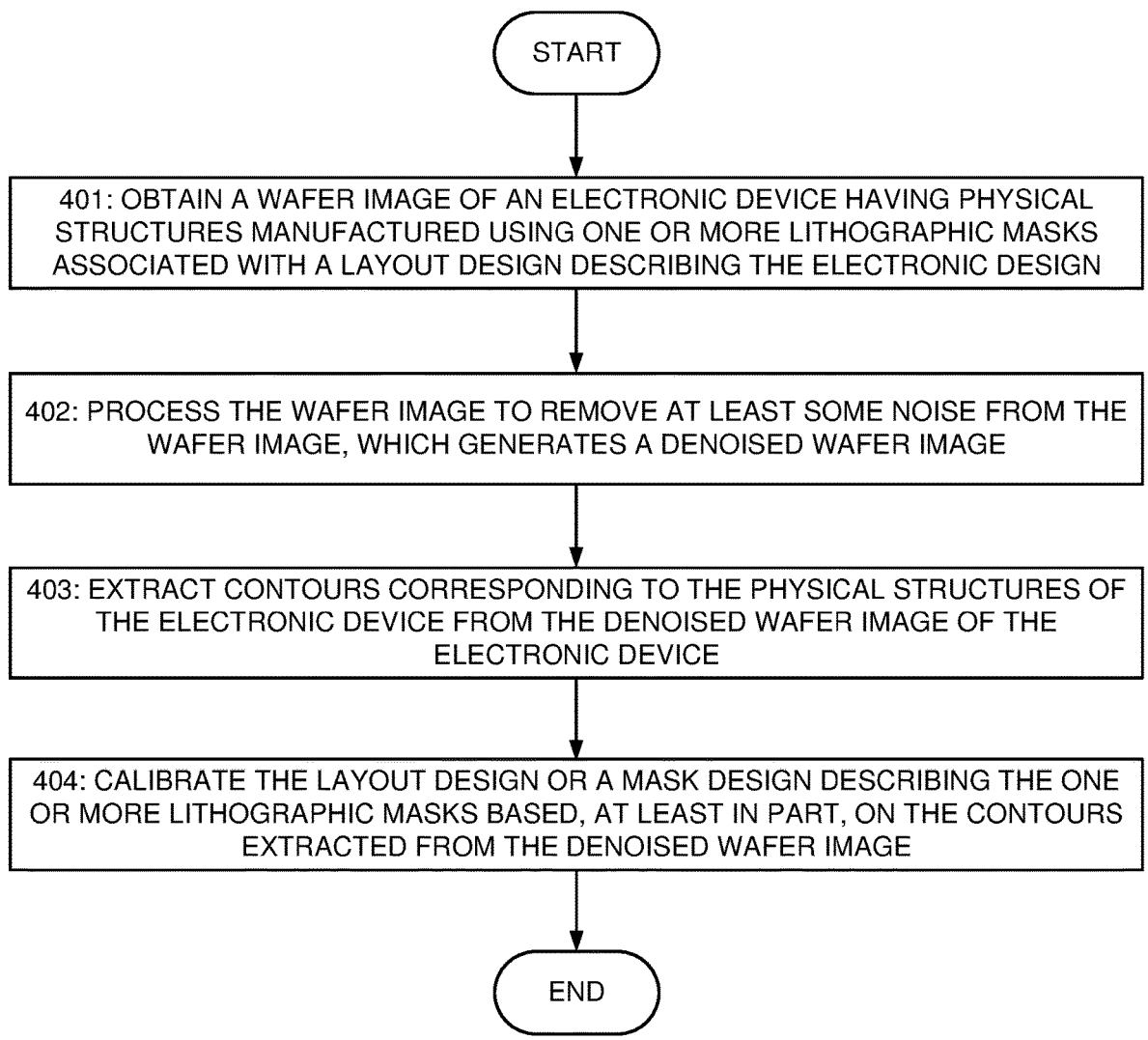
FIG. 4 illustrates a flowchart showing example wafer image denoising and contour extraction according to various examples.

Wafer Image Denoising and Contour Extraction for Manufacturing Process Calibration FIG. 3 illustrates an example of contour extraction tool 300 implementing a wafer image denoising and contour extraction for manufacturing process calibration according to various embodiments. FIG. 4 illustrates a flowchart showing example wafer image denoising and contour extraction according to various examples. Referring to FIGS. 3 and 4, the contour extraction tool 300, for example, implemented using the computing device 101 described with reference to FIG. 1, can, in a block 401 of FIG. 4, obtain a wafer image 301 of an electronic device having physical structures manufactured using one or more lithographic masks associated with a layout design describing the electronic device. In some embodiments, the wafer images 301 can include an image generated by a scanning electron microscope (SEM) system that can be utilized to collect measurements during optical lithographic experiments for different features on a wafer, for example, performed by a foundry at a manufacturing process node. The wafer image 301 can include geometrical patterns, such as L/S (line-space), C/H (contact-hole), pillars with different scan types, SRAM structure and Logic structure, or the like, and can include noise, such as stochastic noise, obscuring the depiction of the geometrical patterns in the wafer image 301.

The contour extraction tool 300, in a block 402 of FIG. 4, can process the wafer image 301 to remove at least some noise from the wafer image 301, which generates a denoised wafer image 311. The contour extraction tool 300 can include a noise reduction system 310 to remove noise from the wafer image 301, for example, using an unsupervised deep learning-based algorithm or a machine-learning algorithm. The unsupervised deep learning-based algorithm or machine-learning algorithm can be implemented using an unsupervised generative adversarial network (GAN), Encoder-Decoder based network, a CNN (Convolutional Neural Network) model, or the like. In some embodiments, the noise reduction system 310 can determine a noisy pixel distribution within the wafer image 301 and a structure or geometrical pattern pixel distribution within the wafer image 301, and utilize the noisy pixel distribution and the structure pixel distribution within the wafer image 301 to identify the presence of stochastic noise in the wafer image 301. The noise reduction system 310 remove at least a portion of the stochastic noise from the wafer image 301 based on the noisy pixel distribution and the structure pixel distribution within the wafer image 301. By removing the noise from the wafer image 301, rather than suppressing the noise by smoothing pixels in the wafer image 301, the noise reduction system 310 can output a denoised image 311 corresponding to the wafer image 301 with noise having been removed relative to the geometrical pattern features depicted in the wafer image 301.

The contour extraction tool 300, in a block 403 of FIG. 4, can extract contours corresponding to the physical structures of the electronic device from the denoised wafer image 311 of the electronic device. In some embodiments, the contour extraction tool 300 can include a guided contour extraction system 320 to implement one or more contour extraction techniques, such as a Sobel operator, a gradient operator, a Canny edge detector, or the like on the denoised wafer image 311. The guided contour extraction system 320 can perform fine tuning on the contours extracted from the denoised wafer image 311, for example, to identify and remove extracted contours corresponding to remaining noise in the denoised wafer image 311. The output of the guided contour extraction system 320 can be the extracted wafer contours 302. Embodiments of the guided contour extraction system 320 with fine tuning will be described below in greater detail with reference to FIG. 5.

Figure 5:
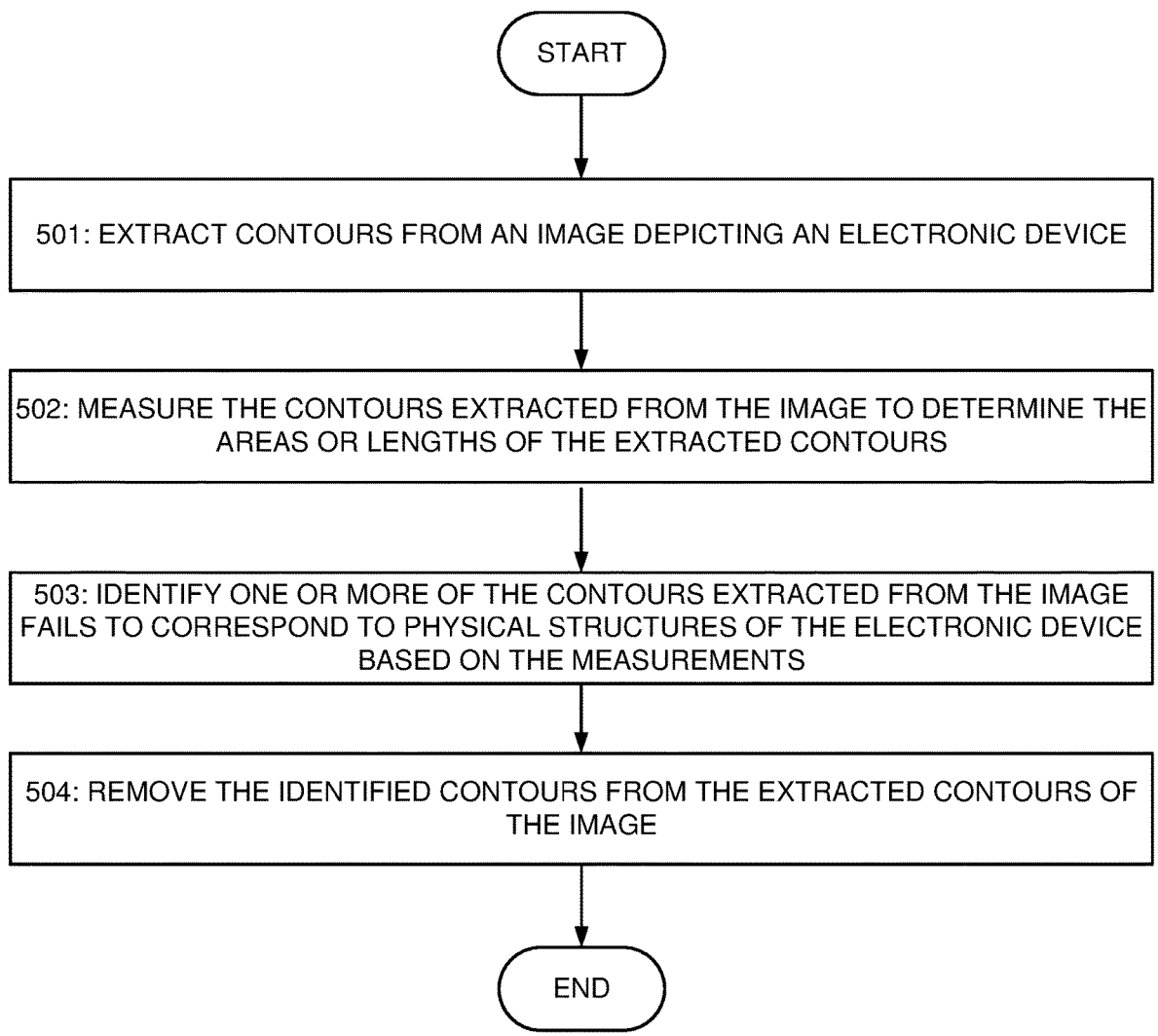
FIG. 5 illustrates a flowchart showing example guided contour extraction of an image depicting an electronic device according to various examples.

FIG. 5 illustrates a flowchart showing example guided contour extraction of an image depicting an electronic device according to various examples. Referring to FIG. 5, a computing system can implement a guided contour extraction system that, in a block 501, can include extract contours from an image depicting an electronic device. In some embodiments the guided contour extraction system can extract contours directly from a wafer image depicting an electronic device having physical structures manufactured using one or more lithographic masks. In some embodiments, the image can be generated by a scanning electron microscope (SEM) system that can be utilized to collect measurements during optical lithographic experiments for different features on a wafer, for example, performed by a foundry at a manufacturing process node. In other embodiments, the guided contour extraction system can extract contours from a denoised version of the wafer image, for example, having undergone a noise removal process, for example, as performed by the noise reduction system 310 of FIG. 3.

The guided contour extraction system, in a block 502, can measure the contours extracted from the image to determine the areas and/or lengths of the extracted contours. In some embodiments, the guided contour extraction system can collate the measured areas and/or measured lengths, for example, to determine a distribution of the physical dimensions based on the measured areas and/or measured lengths.

The guided contour extraction system, in a block 503, can identify one or more of the contours extracted from the image fails to correspond to physical structures of the electronic device based on the measurements. In some embodiments, the guided contour extraction system can identify extracted contours having measured physical dimensions, e.g., a measured area and/or a measured length, that deviate with the distribution of the physical dimensions and/or deviate over a predetermined threshold area or length. For example, the guided contour extraction system can identify a minimum area and/or length of physical structures capable of being manufactured on a wafer, and remove contours having measurements below the minimum area and/or minimum length. In some embodiments, the guided contour extraction system can perform an outlier analysis based on the distribution of the physical dimensions, for example, identifying contours having measurements corresponding to outliers in the distribution of the physical dimensions. The guided contour extraction system also can perform a shape analysis based on the measurements of the contours extracted from the denoised image or the wafer image 301, for example, that can identify extracted contours having measure shapes that deviate from other geometric patterns in the wafer image or the denoised image.

The guided contour extraction system, in a block 504, can remove the identified contours from the extracted contours of the image, which can generate the extracted wafer contours output from the guided contour extraction system. In some embodiments, the guided contour extraction system can reperform the contour extraction of the image, for example, with a direction to remove identified contours. By performing contour extraction on the image of the electronic device and then analyzing the physical dimensions of the extracted contours to remove deviant contours, the guided contour extraction system can generate the extracted wafer contours without having to reference the layout design of the electronic device or the mask design of the lithographic masks utilized to manufacture the electronic device.

Referring back to FIGS. 3 and 4, in some embodiments, the guided contour extraction system 320 can implement a deep-learning-based contour extraction on the denoised wafer image 311 or the wafer image 301. In some embodiments, the deep-learning-based contour extraction can be implemented as a generative adversarial network (GAN), Encoder-Decoder based network, a CNN model (Convolutional Neural Network) with supervised, unsupervised, or semi-supervised learning, or the like. The output of the deep-learning-based contour extraction can be the extracted wafer contours 302. The contour extraction tool 300, in a block 404 of FIG. 4, can output the extracted wafer contours 302 to calibrate the layout design or a mask design describing the one or more lithographic masks based, at least in part, on the contours extracted from the denoised wafer image.

The contour extraction tool 300 can include a contour analysis system 330 to perform a validation of the denoised image 311 by analyzing the wafer image 301 and the denoised image 311 to generate a confidence metric quantifying the improvement in the wafer image 301 due to the removal or reduction of noise by the noise reduction system 310. In some embodiments, the contour analysis system 330 can perform a contour analysis on the wafer image 301 and the denoised image 311 with extracted contours of the different geometric shapes in the wafer image 301 and the denoised image 311, such as the extracted wafer contours 302 and extracted noisy contours 321 of a contour extraction directly from the wafer image 301. The contour analysis system 330 can compare the extracted wafer contours 302 against noisy SEM image, such as the wafer image 301, and a denoised SEM images, such as the denoised image 311, to determine how well the contours of the geometric shapes in the wafer image 301 and the denoised image 311 were extracted by the guided contour extraction system 320. Based on the comparison, the contour analysis system 330 can determine scores for the extracted noisy contours 321 and the extracted wafer contours 302 and then utilize the scores from the extracted noisy contours 321 and the extracted wafer contours 302 to determine the confidence metric 303 quantifying the improvement in the wafer image 301 due to the removal or reduction of noise. The confidence metric 303 can indicate how well the removal or reduction of noise in the wafer image 301 improved the contour detection accuracy in the extracted wafer contours 302 from the resulting denoised image 311.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   obtaining, by a computing system, a wafer image of an electronic device having physical structures manufactured using one or more lithographic masks associated with a layout design describing the electronic design;
   processing, by the computing system, the wafer image to remove at least some noise from the wafer image, which generates a denoised wafer image, wherein the processing of the wafer image determines a noisy pixel distribution within the wafer image and a structure pixel distribution within the wafer image, utilizes the noisy pixel distribution and the structure pixel distribution within the wafer image to identify the presence of stochastic noise in the wafer image, and removes at least some noise from the wafer image by removing at least a portion of the stochastic noise from the wafer image based on the noisy pixel distribution and the structure pixel distribution within the wafer image; and
   extracting, by the computing system, contours corresponding to the physical structures of the electronic device from the denoised wafer image of the electronic device.

2. The method of claim 1, further comprising calibrating, by the computing system, the layout design or a mask design describing the one or more lithographic masks based, at least in part, on the contours extracted based on the denoised wafer image.

3. The method of claim 1, wherein extracting the contours corresponding to the physical structures of the electronic device from the denoised wafer image of the electronic device further comprises:
   measuring at least one of areas and lengths of the contours extracted from the denoised wafer image;
   identifying one or more of the contours extracted from the denoised wafer image have areas or lengths fall below of threshold area or length; and
   removing the identified contours from the extracted from the contours extracted from the denoised wafer image.

4. The method of claim 1, wherein extracting the contours corresponding to the physical structures of the electronic device based on the denoised wafer image is performed without use of the layout design or a mask design describing the one or more lithographic masks.

5. The method of claim 1, wherein the computing system is configured to implement an unsupervised deep learning algorithm to remove at least some noise from the wafer image.

6. The method of claim 1, wherein the computing system is configured to implement a deep learning algorithm to perform the extraction of the contours from the denoised wafer image.

7. The method of claim 1, further comprising:
   comparing, by the computing system, contours extracted from the wafer image to the contours extracted from the denoised wafer image; and
   performing, by the computing system, a validation of the contours extracted from the denoised wafer image based on the comparison.

8. A system comprising:
   a memory system configured to store computer-executable instructions; and
   a computing system, in response to execution of the computer-executable instructions, is configured to:
     obtain a wafer image of an electronic device having physical structures manufactured using one or more lithographic masks associated with a layout design describing the electronic design;
     process the wafer image to remove at least some noise from the wafer image, which generates a denoised wafer image, wherein the processing of the wafer image determines a noisy pixel distribution within the wafer image and a structure pixel distribution within the wafer image, utilizes the noisy pixel distribution and the structure pixel distribution within the wafer image to identify the presence of stochastic noise in the wafer image, and removes at least some noise from the wafer image by removing at least a portion of the stochastic noise from the wafer image based on the noisy pixel distribution and the structure pixel distribution within the wafer image; and
     extract contours corresponding to the physical structures of the electronic device based, at least in part, on the denoised wafer image of the electronic device.

9. The system of claim 8, wherein the computing system, in response to execution of the computer-executable instructions, is further configured to calibrate the layout design or a mask design describing the one or more lithographic masks based, at least in part, on the contours extracted from the denoised wafer image.

10. The system of claim 8, wherein the computing system, in response to execution of the computer-executable instructions, is further configured to:
    measuring at least one of areas and lengths of the contours extracted from the denoised wafer image;
    identifying one or more of the contours extracted from the denoised wafer image have areas or lengths fall below of threshold area or length; and
    removing the identified contours from the extracted from the contours extracted from the denoised wafer image.

11. The system of claim 8, wherein extracting the contours corresponding to the physical structures of the electronic device from the denoised wafer image is performed without use of the layout design or a mask design describing the one or more lithographic masks.

12. The system of claim 8, wherein the computing system is configured to implement an unsupervised deep learning algorithm to remove at least some noise from the wafer image.

13. The system of claim 8, wherein the computing system is configured to implement a deep learning algorithm to perform the extraction of the contour from the denoised wafer image.

14. An apparatus comprising at least one computer-readable memory device storing instructions configured to cause one or more processing devices to perform operations comprising:
   obtaining a wafer image of an electronic device having physical structures manufactured using one or more lithographic masks associated with a layout design describing the electronic design;
   processing the wafer image to remove at least some noise from the wafer image, which generates a denoised wafer image, wherein the processing of the wafer image determines a noisy pixel distribution within the wafer image and a structure pixel distribution within the wafer image, utilizes the noisy pixel distribution and the structure pixel distribution within the wafer image to identify the presence of stochastic noise in the wafer image, and removes at least some noise from the wafer image by removing at least a portion of the stochastic noise from the wafer image based on the noisy pixel distribution and the structure pixel distribution within the wafer image;
   extracting contours corresponding to the physical structures of the electronic device based, at least in part, on the denoised wafer image of the electronic device.

15. The apparatus of claim 14, wherein the instructions are configured to cause one or more processing devices to perform operations further comprising calibrating the layout design or a mask design describing the one or more lithographic masks based, at least in part, on the contours extracted from the denoised wafer image.

16. The apparatus of claim 14, wherein extracting the contours corresponding to the physical structures of the electronic device from the denoised wafer image of the electronic device further comprises:
   measuring at least one of areas and lengths of the contours extracted from the denoised wafer image;
   identifying one or more of the contours extracted from the denoised wafer image have areas or lengths fall below of threshold area or length; and
   removing the identified contours from the extracted from the contours extracted from the denoised wafer image.

17. The apparatus of claim 14, wherein extracting the contours corresponding to the physical structures of the electronic device from the denoised wafer image is performed without use of the layout design or a mask design describing the one or more lithographic masks.

18. The apparatus of claim 14, wherein the computing system is configured to implement an unsupervised deep learning algorithm to remove at least some noise from the wafer image.

19. The apparatus of claim 14, wherein the computing system is configured to implement a deep learning algorithm to perform the extraction of the contour from the denoised wafer image.

20. The apparatus of claim 14, wherein the instructions are configured to cause one or more processing devices to perform operations further comprising:
   comparing contours extracted from the wafer image to the contours extracted from the denoised wafer image; and
   performing a validation of the contours extracted from the denoised wafer image based on the comparison.

* * * * *